Jan. 12, 1965 W. STERN 3,165,232
ARTICLE ORIENTING MECHANISM
Filed Aug. 27, 1962 2 Sheets-Sheet 1
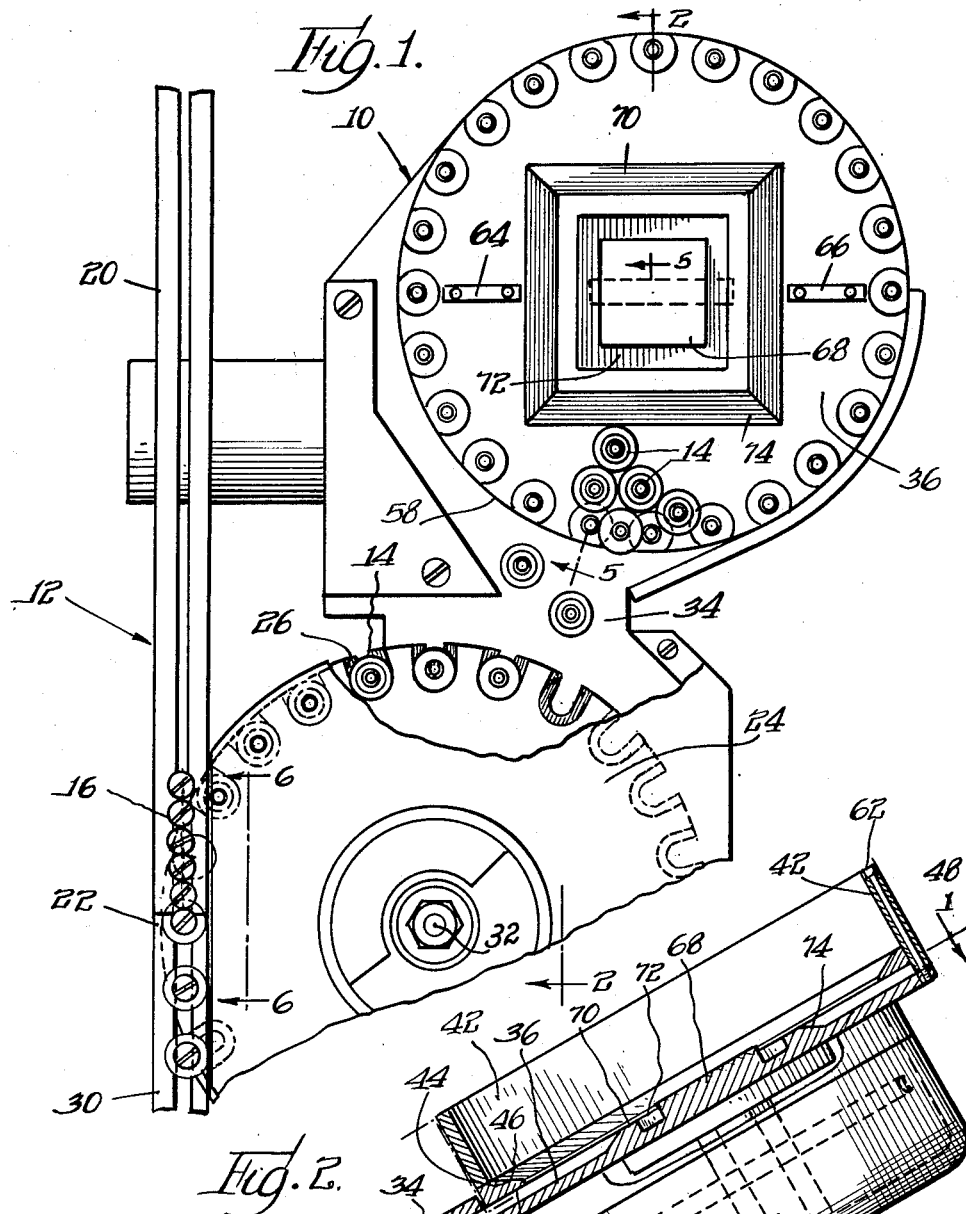
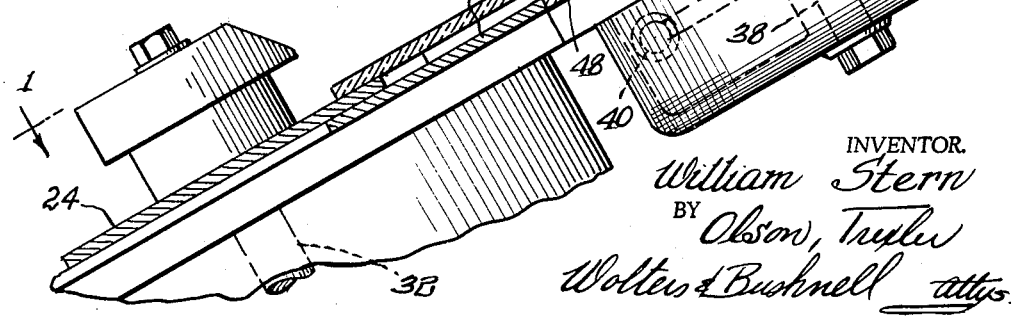
INVENTOR.
William Stern
BY Olson, Trexler
Wolters & Bushnell attys

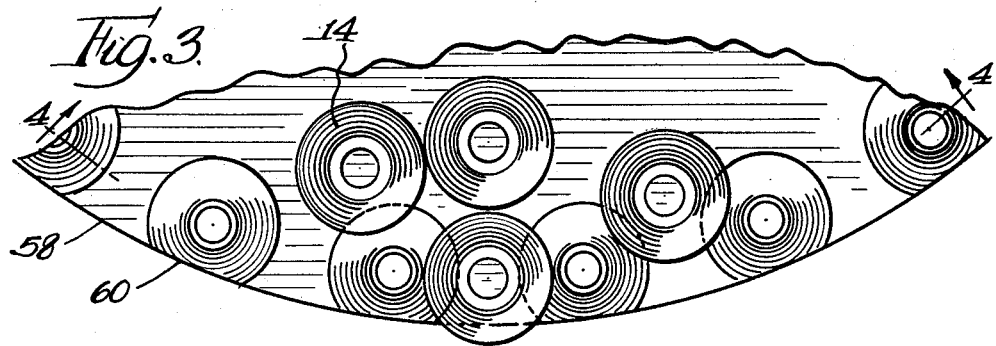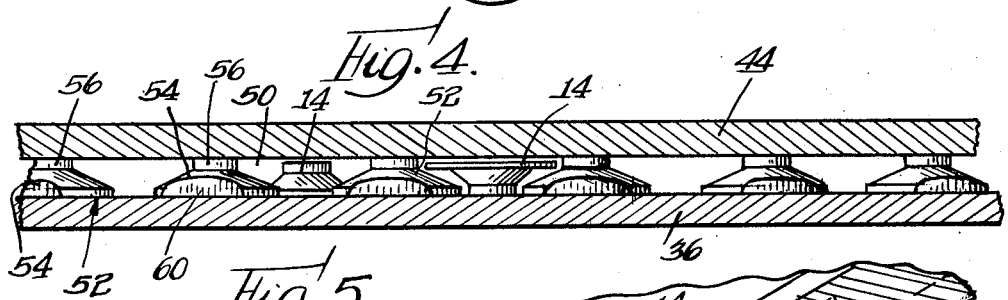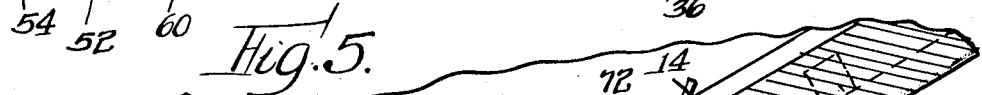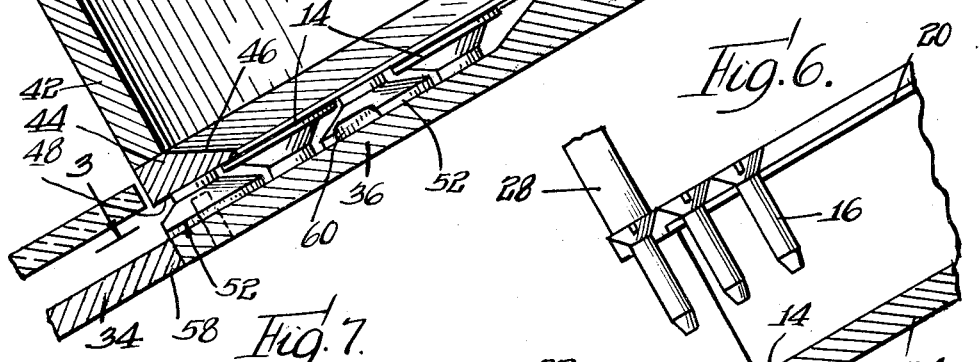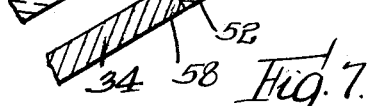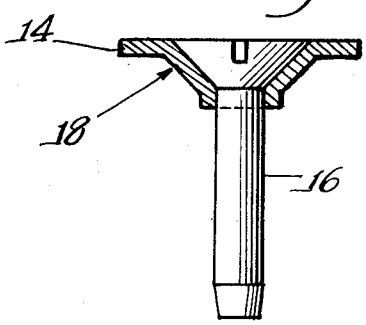
INVENTOR.
William Stern
BY Olson, Trexler
Wolters & Bushnell attys.

3,165,232
ARTICLE ORIENTING MECHANISM
William Stern, Park Ridge, Ill., assignor to Illinois Tool
Works Inc., Chicago, Ill., a corporation of Delaware
Filed Aug. 27, 1962, Ser. No. 219,639
4 Claims. (Cl. 221—168)

The present invention relates to a novel apparatus for orienting workpieces in a predetermined manner, and more specifically to a novel apparatus for orienting devices such as washers for subsequent assembly with screws.

When processing numerous articles such as washers, it is frequently necessary to orient the devices in a particular manner. For example, washers are frequently assembled with screws and many washers are formed so that it is necessary to position a predetermined side of the washers adjacent the head of the screw. Thus, machines have been suggested for assembling washers with screws, which machines include mechanisms for orienting the washers in a manner such that all of the washers will be successively presented right side up to a work station at which they will be assembled with successive screw elements.

Orienting mechanisms of the type contemplated herein have generally been adapted to receive a mass or bulk supply of articles or washers. The mechanisms are fully adapted to dispense such washers in a right side up position regardless of the position in which the washers were initially supplied to the mechanism. While many of these mechanisms have been generally satisfactory, problems have been encountered as a result of the tendency for the articles or washers to jam with each other and with portions of the mechanisms.

It is an important object of the present invention to provide a novel article or washer orienting mechanism which is efficient in operation and minimizes any possibility of jamming.

A further important object of the present invention is to provide a novel article or washer orienting mechanism which is adapted to break up any jamming in a mass of washers or other articles supplied thereto and positively to reposition the washers when necessary for enabling the washers to be dispensed in a right side up condition.

Still another object of the present invention is to provide a novel orienting mechanism of the above described type which is of simple and economical construction.

Other objects and advantages of the present invention will become apparent from the following description and the accompanying drawings wherein:

FIG. 1 is a fragmentary sectional view taken generally along line 1—1 in FIG. 2;

FIG. 2 is a fragmentary sectional view taken generally along line 2—2 in FIG. 1;

FIG. 3 is an enlarged fragmentary view taken generally along line 3—3 in FIG. 5;

FIG. 4 is a fragmentary sectional view taken along line 4—4 in FIG. 3;

FIG. 5 is an enlarged fragmentary sectional view taken along line 5—5 in FIG. 1;

FIG. 6 is an enlarged fragmentary sectional view taken generally along line 6—6 in FIG. 1; and FIG. 7 is a partial sectional view showing a washer and screw assembly which may be processed with the apparatus of the present invention.

Referring now more specifically to the drawings, wherein like parts are designated by the same numerals throughout the various figures, an article or washer orienting mechanism 10 incorporating features of the present invention is shown in FIGS. 1-5. While the orienting mechanism may be used for various purposes, it is especially suitable for installation in an apparatus 12 which is adapted to assemble washers 14 and screw blanks 16 to provide an assembly 18 as shown in FIGS. 6 and 7.

As will be understood, the apparatus 12 comprises a guideway or chute 20 for supplying a series of screw blanks 16 to a predetermined work station 22. A rotary disc 24 having a plurality of circumferentially spaced pockets 26 around its periphery is provided for feeding successive washers 14 to the work station 22. As indicated in FIGS. 1 and 6, a suitable reciprocable member 28 is mounted for inserting the screw blank through a washer at the work station 22. The assembly is then advanced along another guideway or chute 30 to a suitable point of discharge or for further processing.

The feeding disc 24 is fixed on an upper end portion of a driven shaft 32, which shaft is inclined from the vertical as shown in FIG. 2 so that the disc rotates in an inclined plane. An upper marginal portion of the disc 24 overlies a fixed flat plate member 34 which is inclined from the vertical and parallel to the disc 24 as shown in FIG. 2. As will be described more in detail below, the orienting mechanism 10 is adapted to discharge washers in a right side up position onto the plate 34. The washers then slide down the inclined plate member 34 and enter the pockets 26 on the feeding disc 24 for further advancement to the work station 22.

The orienting mechanism 10 comprises a rotary disc 36 disposed above and substantially coplanar with the plate or slide member 34 as shown best in FIG. 2. The disc 36 is fixed on a shaft 38 which is constantly driven by suitable drive means 40.

An annular wall 42 is mounted above the disc 36 so that the orienting mechanism is adapted to contain a substantial mass or supply of the washers 14. A ring 44 is fixed beneath the lower edge of the wall 42, which ring has a radial width substantially greater than the thickness of the wall and a bevelled surface 46 for directing washers generally radially inwardly. It is to be noted that a lower surface 48 of the ring 44 is spaced above the uppermost surface of the disc 36 a distance similar to but slightly greater than the axial extent or thickness of the article or washer being processed. In the particular embodiment disclosed, the washers 14 have a generally frusto-conical portion so that the spacing between the surface 48 and the disc 36 must be greater than the thickness of the washer material and sufficient to accommodate the frusto-conical portion of the washer.

In accordance with a feature of the present invention, the space between the surface 48 and the disc 36 is divided up into a plurality of openings 50 by means of a plurality of button-like elements 52 spaced around and fixed on a marginal portion of the disc 36. It is particularly important to note that the button elements have a rounded or generally circular configuration as shown best in FIG. 3. Thus these elements present only rounded surfaces for engagement with the articles or washers 14, and it has been found that this structure greatly minimizes any possibility of the washers jamming as they are dispensed from the orienting mechanism.

It is to be noted that the button-like elements 52 are constructed so as to present a profile similar to the profile of the articles or washers to be processed. Furthermore, the buttons are spaced apart so that the openings 50 therebetween have a profile similar to but slightly larger than that of the articles or washers. The construction is such that the washers may pass through the openings 50 only when the washers are in the desired right side up position. Thus in the embodiment shown, each button element has a generally conical base portion 54 and an upper cylindrical portion 56. The base portions 54 are spaced apart so that the small ends of the washers 14 disclosed herein may pass therebetween while the upper ends or cylindrical portions 56 are spaced apart so as to permit the flange portions of the washer to pass therebetween.

It is further to be noted that the button elements 52 are disposed so that their centers or axes are spaced from a peripheral edge 58 of the disc 36 a distance less than the radius of curvature of the button. Thus the outwardly facing portions of the buttons are flattened as at 60. Furthermore, this arrangement enables the minimum dimension of the openings 50 to be located relatively close to the edge 58 of the rotating disc so that when a washer 14 passes through an opening 50, it slides immediately onto the fixed plate member 34 so as to minimize any possibility of the rotating disc and button elements striking a discharged washer in a manner which will cause it to be turned upside down.

The ring member 44 and the annular wall 42 are supported above the rotatable disc 36 on the upper ends of the button elements 52, and suitable means is provided for securing these parts in assembled relationship. For example, as shown in FIG. 2, a plurality of elongated screws 62 may be inserted through aligned apertures in the wall 42 and ring 44 and threaded into tapped apertures in the plate member 36. These screws may also be aligned with and extend through the button elements 52.

As previously indicated, a substantial mass of the articles or washers may be piled into the orienting mechanism. As will be understood many of the washers in such a pile may tend to bunch and jam together, particularly in the event that twisted tooth or other type lock washers are being processed. The orienting mechanism 10 is provided with means for positively breaking up any bunching or jamming of the washers and also for positively manipulating the washers so that all of the washers will eventually be turned upside right. More specifically, blade members 64 and 66 are secured in radially extending positions on the disc 36. At least two of these blade members are preferably provided at generally diametrically oppositely disposed portions of the disc. These blade members serve to agitate portions of the workpieces or washers which may be piled adjacent the wall member 42. As will be understood, the pile of washers will tend to gravitate toward the lower side of the orientating means. The blade members 64 and 66 will thus tend to keep the articles or washers in a state of agitation for accomplishing more rapid and efficient orientation.

Additional agitating means is provided on a central portion of the disc 36. In the embodiment shown, this agitating means comprises a polygonal block 68 having at least four sides and preferably being substantially square. The block 68 is mounted so that it is substantially concentric with the disc 36. A rib 70 complementary in shape to the periphery of the block 68 is fixed on the disc 36 in spaced relationship with respect to the block 68. Thus a groove 72 is defined between the block 68 and the rib 70. The groove 72 has a width and depth similar to the radius of the articles or washers being processed but substantially less than the diameter of such washers. With this construction many of the washers piled within the orientating mechanism will partially enter the groove 72 and assume a canted position as shown best in FIG. 5. Then as the disc 36 continues to rotate the washers which are piled on top of the tilted or canted washer will engage the upwardly projecting edge of the canted washer and cause it to flip over. Eventually all of the washers will be turned to the desired right side up position. As shown best in FIG. 5, the rib 70 has a height slightly less than the central block 68 and a bevelled outer side portion 74 for facilitating movement of a canted washer over the rib and down toward the lower or discharge side of the orienting mechanism.

While the preferred embodiment of the present invention has been shown and described herein, it is obvious that many details may be changed without departing from the spirit and scope of the appended claims.

The invention is claimed as follows:

1. A mechanism for orienting articles such as washers to a desired right side up position, comprising rotatable inclined disc means, means disposed above said disc means for retaining a mass of said articles on said disc means, a plurality of rounded elements spaced around said disc means between the disc means and said retaining means and defining openings for permitting passage of the articles therebetween only when said articles are in the desired right side up position, and means fixed on and movable with said disc means for agitating said mass of articles, said agitating means comprising means defining a generally annular groove on said disc means and having a width less than the diameter of articles being processed for causing portions of said articles to enter partially into the groove and assume a canted position with respect to the disc means for facilitating turning of the articles.

2. A mechanism, as defined in claim 1, wherein said means defining said groove comprises a member centrally disposed on said disc means, and a second member disposed adjacent said first member and combining with said first member in defining the groove.

3. A mechanism, as defined in claim 1, wherein said groove has a depth not substantially in excess of the radius of said articles.

4. A mechanism, as defined in claim 1, wherein said generally annular groove has a substantially rectangular configuration.

References Cited by the Examiner
UNITED STATES PATENTS

| | | | |
|---|---|---|---|
| 531,001 | 12/94 | Muslar | 221—168 |
| 2,033,988 | 3/36 | Johnson | 221—170 |
| 2,321,548 | 6/43 | Hanneman | 221—169 |
| 2,595,324 | 11/60 | Hendrickson et al. | 221—168 |

ANDREW R. JUHASZ, *Primary Examiner.*